[3,583,961]

Patented June 8, 1971

3,583,961
NITRATED POLYMERS CROSSLINKED WITH POLYISOCYANATES
Daniel Magay, Palo Alto, Calif., assignor to Raychem Corporation, Menlo Park, Calif.
No Drawing. Filed Aug. 30, 1968, Ser. No. 756,428
Int. Cl. C08f 27/08, 27/10
U.S. Cl. 260—89.1                                30 Claims

ABSTRACT OF THE DISCLOSURE

Nitrated polymers, formed by treatment of the polymers with nitrogen dioxide, are crosslinked either by reaction with polyfunctional isocyanate compounds alone or alternately by the sequential reaction of a polyisocyanate compound followed by the exposure of the nitrated polymer-isocyanate system to water or similar reagent which contains two or more reactive hydrogen atoms. With either of the alternate crosslinking schemes, the reactions can be accelerated by the use of catalyst.

BACKGROUND OF THE INVENTION

It is well known that the usefulness of polymers and particularly shaped articles can be greatly extended by crosslinking. Crosslinking can be accomplished by treatments such as ionizing radiation or ultraviolet light in the presence of a photo-active agent or by the use of chemical agents such as peroxides. The crosslinking of polymers and shaped articles thereof brings about substantial improvement in the properties, including increased tensile strength, substantially reduced solubility, stress crack resistance, improved thermal dimensional stability and the ability to exhibit elastic memory.

There are several well known methods according to which recoverable materials may be formed such that they possess the property of elastic memory. One such method is clearly disclosed in U.S. Pat. No. 2,027,962 which is incorporated herein by reference. As disclosed in that patent, such materials are independently dimensionally heat unstable, i.e., capable of changing dimension to assume the heat stable condition upon the application of heat alone. In general, the heat recoverable material can be formed by crosslinking a polymer in a given configuration, applying heat and deforming the polymer to a new form and then cooling the polymer in this new form. Upon the subsequent application of heat, the article will tend to return to the original form in which it was crosslinked.

In the fabrication of heat recoverable articles and other types of crosslinked materials, there is considerable advantage to be obtained by crosslinking in the solid state. Here crosslinking occurs after fabrication and the internal forces holding the polymer molecules together are strong enough to keep the shaped object from distortion. The temperature at which crosslinking takes place should, of course, be below that at which distortion of the article will occur. Two commonly used methods of solid state crosslinking are treatment with ionizing radiation and ultraviolet light.

The crosslinking of polyolefins such as polyethylene and ethylene copolymers by ionizing radiation suffers from certain disadvantages. In general, it is an expensive process and more importantly only shaped articles with some degree of geometric regularity, i.e., tubing and wire insulation, are readily crosslinked when the source of radiation is charged particles such as electrons. With gamma radiation, this objection is not so severely felt, but the rates are very slow with hours generally required for substantial used crosslinking.

With ultraviolet light, in order to obtain effective or useful crosslinking, the object to be crosslinked must be reasonably transparent to ultraviolet light, precluding the use of reinforcing fillers such as carbon black, flame retardant additives, i.e., antimony oxide, etc. Further, such an ultraviolet transparent object may subsequently exhibit poor weathering or aging when exposed to outdoors.

Chemical crosslinking of polymers in the molten state avoids some of these problems of irradiation and can be accomplished by adding organic compounds such as peroxides, azides, etc., to the polymer. However, chemical crosslinking normally must be carried out in the molten state rather than the solid state. Molten state chemical crosslinking is necessitated by the fact that the temperatures at which the crosslinking agent is incorporated into the polymer and at which crosslinking takes place are both usually higher than the melting point of the uncrosslinked polymer. Of course, fabrication into a shaped article must occur in the uncrosslinked state. Thus, chemical crosslinking usually must be carried out in the molten state, within the confines of some sort of mold or constraint used to form the shaped article.

SUMMARY OF THE INVENTION

It is accordingly an object of the present invention to provide a novel process for the forming of a novel chemically crosslinked polymer.

A further important object is to provide a method of chemically crosslinking a polymer in the solid state, i.e. at relatively low temperatures.

It is further an object of this invention to provide a novel crosslinked polymer.

It is a further object of this invention to provide a chemically crosslinked polymer that can contain additives such as antioxidants and stabilizers that cannot easily be used in prior art crosslinking systems.

Other objects will become apparent from a more detailed description as follows.

Briefly, the present invention comprehends the crosslinking of polymers by first reacting them with a nitrating agent such as nitrogen dioxide. The principal manifestation of this treatment is the introduction of nitro groups into the polymer chain in a somewhat random sequence. The so-treated polymer can then be crosslinked by two alternate methods.

Method one, comprehends treatment of the nitrated polymer with a polyfunctional isocyanate. The so-treated polymer is crosslinked by exposing it to specified temperatures.

The alternative, or method two, is to treat the nitrated polymer with polyisocyanate, preferably in excess based upon the nitro groups present in the polymer. The resulting "isocyanated" nitrated polymer remains uncrosslinked and is then fabricated and allowed to come into contact with polyfunctional active hydrogen compounds such as water, ethylene glycol, etc., whereby crosslinking takes place.

DESCRIPTION OF PREFERRED EMBODIMENTS

This invention is applicable in general to polymers derived from mono-ethylenically unsaturated monomers. The polymer should contain repeating $-CH_2-$ units capable of being nitrated as in polyolefins. Polymers that may be used in the present invention include polyethylene, polybutene-1, polyvinyl acetate, polyethyl acrylate, poly(cetyl acrylate), copolymers thereof, etc. Thus, it is believed that any polymer capable of having active sites introduced by nitration, either in the backbone or the side chain, may be used and that the polymer may also contain nondeleterious substituents such as benzene groups, ester groups, ether groups, etc.

A suitable method for introducing reactive sites into the polymer is by treating the polymer with nitrogen dioxide ($NO_2$), or fuming nitric acid containing about 20% $NO_2$. It is convenient to carry out the reaction with the polymer in the form of a powder or small granules which are exposed directly to the gaseous nitrogen dioxide. Although a wide range of temperatures can be used for this reaction, it has been found that the reaction is slower at room temperature and a temperature above 60° C. is a preferred reaction temperature. The reaction temperature will, of course, vary with the polymer being treated. The extent of the reaction, namely, the number of nitro groups per gram of polymer, can be controlled by regulating the temperature and the time of nitration, and the amount of reagent such as nitrogen dioxide. It is desirable to exclude all traces of oxygen in the initial reaction condition.

In nitrating powdered polyolefin, it is normally possible to obtain some sort of gross uniform distribution of reactive sites within the polymer. The distribution of nitro groups within a given polymer chain is expected to be somewhat random, but generally all chains contain a number of nitro groups relative to the number of hydrocarbon units in the chain. Such a distribution of nitro groups from one chain to another may be desirable because it is thought that the reactive sites are related to the number of nitro groups and that a crosslink takes place where nitration has occurred. Thus, a uniform distribution of crosslinks can be obtained. However, the uniformity of reactive sites from one polymer chain to another is somewhat dependent upon the rate of diffusion of nitrogen dioxide in the polymer. Thus, when larger particles, or pellets, of polymer are being nitrated, there may be a tendency to form a higher concentration of nitro groups or reactive sites near the outer surface of the particle. It has been found that this uneven formation of reactive sites is not a great disadvantage since the nitrated pellets are coalesced in the molten state during the act of incorporating additives and/or fabrication and as a result of mixing at that time, a uniform distribution of nitro groups is obtained. It is necessary to have two or more nitro groups per polymer chain if that chain is to participate in the crosslinking.

Although the above described method of introducing reactive sites by nitrating the base polymer has been found particularly effective in carrying out the present invention, the invention is by no means limited to this process of obtaining nitrated polymers and other processes may be employed to form nitrated polymers for use in this invention without departing from the scope of the invention.

The nature of the reactive sites is not well understood. The nitration reaction is believed to be free-radical in nature. During nitration, the functional groups introduced into the polymer include nitrite ester, nitrate ester, and nitroso groups. The amount of crosslinking has been found to be proportional to the square of the nitro group concentration in the polymer. This and other evidence suggests that the sites are related to a group containing the following functionality:

Reaction of isocyanates with secondary nitroalkanes is stated in the literature to proceed very slowly, and it was surprising to find that polyisocyanates reacted quite readily with the nitrated polymers to form crosslinked polymers.

Crosslinking may be accomplished by the addition of a polyisocyanate to the nitrated polymer. Depending on the method of addition used, different types of polyisocyanate may be preferred. Alkyl, aryl, and alkaryl polyisocyanates may be used. Examples of isocyanates found to be effective are 4-methyl-m-phenylene diisocyanate, methylene-di-p-phenylene diisocyanate, polymethylene polyphenyl isocyanate, hexamethylene diisocyanate, bitolylene diisocyanate and dianisidine diisocyanate.

It is believed that crosslinking with the polyisocyanates may occur by two different mechanisms. The first is a direct reaction of both isocyanate functional groups of a diisocyanate, for example, with active sites on the nitro polymer. The second, it is believed, is a direct reaction of only one isocyanate containing functional group with an active site on the polymer, the crosslink being completed by a subsequent reaction in the presence of a polyfunctional active hydrogen compound. Both reactions may occur to some extent, but reaction conditions can be tailored so that one reaction will predominate.

Method one.—Practicing Method one, it is generally important to add the isocyanate after fabrication if premature crosslinking is to be avoided. This may be accomplished by exposing a fabricated nitrated polymer to isocyanate vapors while the object is maintained in the solid state. Alternatively, it may be accomplished by adding a blocked isocyanate to the molten polymer, confining this reaction system in the molten state in some sort of mold, and elevating the temperature to the point where the blocked isocyanate decomposes and yields reactive diisocyanate. An example of blocked isocyanate is a reaction product of phenol and methylene-di-p-phenylene diisocyanate. The preferred practice of Method one is to expose the fabricated nitrated polymeric object to vapors of a volatile diisocyanate, such as tetramethylene diisocyanate or hexamethylene diisocyanate. The exposure conditions should be that water and oxygen are excluded, and the temperature should be below the softening or distortion point of nitrated polymer, but high enough to have reasonably fast diffusion of polyisocyanate into the shaped article. In the case of nitrated polyethylene, the temperature should be about 100° C. or lower.

Method two.—The second method of crosslinking disclosed with the nitrated polymer involves the reaction of the polymer with a polyfunctional isocyanate compound. Again alkyl, aryl, and alkaryl polyisocyanates may be used. With this method the isocyanate is incorporated into the polymer generally by means of molten state mixing. Here in Method two the preferred isocyanate may be rather less volatile than those used with Method one. After the isocyanate is added, the polymer system remains uncrosslinked and can be fabricated. After shaping, it can then be exposed to a polyfunctional active hydrogen compound. By active hydrogen compound is meant those hydrogen compounds that are known to react quickly with isocyanates, generally polyfuctional alcohols, for example, glycols and triols, and amines, for example, diamines, e.g., ethylenediamine, and ethanolamine. Hindered diphenols are not suitable for use in this invention. The preferred difunctional reagent is water, which presumably effects a crosslink by reacting with two pendant isocyanate groups to form a urea linkage between polymer chains with the evolution of carbon dioxide.

It is also possible by Method two to effect crosslinking in the molten state. In this instance, a blocked polyfunctional hydrogen compound might be used such as hexamethylenediamine carbamate. With this alternate in Method two, the isocyanate is added to the nitrated polymer and then a blocked active hydrogen compound added. This uncrosslinked molten state system is then fabricated in the confines of a mold and heated to temperatures where the blocked hydrogen compound decomposes to yield the active reagent, e.g., hexamethylenediamine carbamate yields hexamethylenediamine.

The crosslinking temperature, i.e., the temperature at which the active hydrogen compound is contacted with fabricated objects will vary. It is preferred, as with Method one, that the crosslinking reaction occur well below the distortion point of the polymer, in the case of nitrated polyethylene, 100° C. or lower. When water is the active hydrogen compound, crosslinking can be effected at room temperature, crosslinking occurring over a short period, depending on the reactivity of the isocyanate, the catalyst system, the humidity and the diffusibility of water in the polymer system.

The type of crosslinking reaction that will take place can be influenced by the reaction conditions. For example, Method two is promoted by an amount of isocyanate large enough so that there are at least two inocyanate groups for every nitro group. This may be because Method two is postulated to require two isocyanate groups per nitro group as opposed to one isocyanate group per nitro group in the reaction of Method one.

The use of catalysts can also influence the reaction path. In general, the presence of a strong catalyst during isocyanate addition will tend to favor Method one. Catalysts also accelerate the reaction with the difunctional hydrogen compound in Method two. Catalysts which are effective in this invention include various organo-metals and amines. Suitable organo-metal catalysts include: dibutyltin adipate, dibutyltin dilaurate, tetraphenyltin, copper stearate, cupric acetylacetonate, cobalt resinate, ferrocene, ferrous stearate, vanadyl naphthanate, vanadyl acetylacetonate, vanadium acetylacetonate, stannous octoate, lead octoate, zinc stearate, and chromium stearate. Suitable amine catalysts include: trimethylamine, tripropylamine, tributylamine, trihexylamine, triethylenediamine, etc. The catalyst may be introduced into the nitrated polymer by several convenient methods, e.g., it may be milled with the nitrated polymer to obtain a uniform distribution or it can also diffuse into polymer after fabrication.

While this invention may be used to crosslink polymers in the molten state, as well as the solid state, one of its most important virtues is that crosslinking can be effected in the solid state below the distortion point of the polymer. With Method two, for example, diisocyanate can be added to the nitrated polymer, catalysts and other additives incorporated, and pellets formed from this molten mixture. So long as these pellets are kept out of contact of difunctional active hydrogen compounds, e.g., water, they will remain uncrosslinked, and can be stored for long periods of time. The pellets can be remelted and an object shaped from this melt. When, and only when, the materials are exposed to a polyfunctional active hydrogen compound, such as water, will crosslinking be effected. If a catalyst is to be used, it is preferable to add it shortly before fabrication. In the absence of catalyst, the "isocyanated" nitropolyolefin is less susceptible to premature crosslinking by water at room temperature.

In general, the nitrated polymer of the present invention can undergo all conventional types of fabrication including extrusion, below molding and injection molding to form a satisfactory product.

Those polymers which display good elastic memory when crosslinked by conventional methods also display good elastic memory when crosslinked by the present invention. Thus, if a shaped article made of such a polymer and crosslinked according to the present invention is heated and distorted to a new shape and set in the new shape, it will return to its original shape upon the application of heat.

Normal additives, such as flame retardants, fillers, antioxidants and stabilizers can be incorporated in the polymer.

One of the particular advantages of carrying out crosslinking by either Method one or two of this invention is that a great number of additives can be incorporated which normally are difficult, if not impossible, to use in prior art crosslinking systems. For example, hindered phenols, such as 4,4'-thiobis(6-t-butyl-m-cresol), are often excellent stabilizers for polyolefins, but have decreased utility when used with crosslinking effected by azides, peroxides, ultraviolet light, and ionizing radiation. The crosslinking steps in these four crosslinking methods involve free-radical intermediates. The hindered phenols themselves are free-radical scavengers, so in these prior art crosslinking systems, if hindered phenols are present, the hindered phenols tend to inhibit the crosslinking reaction, and in that act of inhibition are themselves rendered less effective, i.e., they may be destroyed. This present invention discloses a crosslinking scheme that involves ionic reactions. The hindered phenols here are not affected by the crosslinking scheme, nor do they affect, to any extent, the crosslinking reaction. These hindered phenols are not active hydrogen compounds by the definition used in the invention.

The invention is further illustrated by the following examples in which all parts are by weight unless otherwise indicated.

EXAMPLE 1

Polyethylene powder was nitrated as follows. A powdered polyethylene having a melt index of 1 and density of 0.916 was placed in a two-liter kettle. The vessel was immersed in a hot oil bath and nitrogen gas was passed through the vessel for 30 minutes to remove oxygen. Subsequently, nitrogen dioxide was introduced and passed over and through the powdered polyethylene. At the end of the nitrogen dioxide treatment, nitrogen was reintroduced into the kettle and passed through and over the sample for 30 minutes to remove unreacted nitrogen dioxide and gaseous reaction products. Final traces of gaseous products were removed in a vacuum oven. The color of the product was dark yellow, possibly due to an antioxidant in the polyethylene.

The nitrated polyethylene was analyzed for the number of methylenes per nitro group by infrared measurements. A calibration curve was obtained by plotting the concentration of 2-nitropropane in cyclohexane against the $-NO_2$ absorbence at 1555 cm.$^{-1}$. Beer's law was obeyed. The concentration of $-NO_2$ groups in the nitropolyethylene was determined assuming no change in the nitro group extinction coefficient. To insure that there is no such variation in the intensity of the $-NO_2$ absorption if in a primary position, a calibration curve of 1-nitropropane was also obtained. It coincided with the curve of the 2-nitropropane within experimental error.

Table I below indicates the degree of nitration for various reaction times.

TABLE I

| Number: | Temperature, °C. | Reaction time (minutes) | Millimoles of $-NO_2$ group/ grams of polymer |
|---|---|---|---|
| 1 | 100 | 25 | 0.083 |
| 2 | 100 | 60 | 9.125 |
| 3 | 100 | 90 | 0.170 |
| 4 | 100 | 120 | 0.275 |
| 5 | 100 | 360 | 0.928 |

The effect of temperature on the degree of nitration was determined using the above outline procedure with a Parr 4500 stainless steel reactor and vacuum in place of the nitrogen purge. The results are summarized below in Table II.

TABLE II

| Number: | Temperature, °C. | Reaction time (minutes) | Millimoles of $-NO_2$ group/ grams of polymer |
|---|---|---|---|
| 1 | (¹) | 19 | (²) |
| 2 | 80 | 2 | 0.170 |
| 3 | 60 | 21 | 0.230 |
| 4 | 60–80 | 20 | .265 |
| 5 | 65–80 | 22 | 0.348 |
| 6 | 60–80 | 21 | 0.447 |

¹ Room temperature.
² No detectable reaction.

The very slow reaction rate at room temperature may be due to the fact that the diffusion rate of $NO_2$ at this temperature is very slow.

EXAMPLE 2

Using the procedure of Example 1, pellets of a polyethylene-vinylacetate copolymer were nitrated using nitrogen dioxide at around 60° C. The pellets were oblate spheroidal in shape, of approximately 3 mm. for a major axis and 2 mm. for a minor axis. The degree of nitration was found to be 0.233 mmoles (mM.) of $-NO_2$ groups per gram of polymer by infrared spectrophotometric absorption.

EXAMPLE 3

Forty pounds of polyethylene pellets, approximately the same size and shape as the copolymer nitrated in Example 2 above, were placed in a 20-gal. glass-lined kettle and agitated by means of an anchor-shaped stirrer. The pellets were heated to 85° C. and exposed to nitrogen dioxide. The nitrated polymer obtained was nearly white, and the infrared spectrophotometric analysis showed 0.130 mM. of nitro groups per gram of polymer.

EXAMPLE 4

The level of nitro groups is conveniently controlled by the amount of nitrogen dioxide exposed to the polymer. In a series of experiments, pellets of polyethylene were reacted in $NO_2$ in a three-necked, 300 ml. round-bottom flask at 90° C. for 18½ hours. The results are shown in Table III below.

TABLE III

| Number: | Weight of polyethylene (grams) | Weight of $NO_2$ (grams) | Millimoles of $-NO_2$ group/ grams of polymer |
|---|---|---|---|
| 1 | 500 | 1.68 | 0.051 |
| 2 | 250 | 1.68 | 0.095 |
| 3 | 125 | 1.01 | 0.121 |

EXAMPLE 5

A polyethylene ethyl acrylate copolymer was nitrated as above. The nitrated material contained 0.231 mM. of nitro group per gram of polymer.

In the following examples, the crosslinking levels of the nitrated polymers were determined by measuring the modulus of elasticity at 150° C. (Young's Modulus), or by ascertaining the level of insoluble material in refluxing xylene (approximately 140° C.). This latter value is expressed as the percent gel, or the percent insolubles. Young's Modulus above the crystalline melting point of polymers is generally proportional to crosslinking levels. While percent gel levels are not proportional to crosslinking, they bear a direct relationship to crosslink levels, i.e., high gels reflect high crosslinking levels; low gels, low crosslinking levels.

EXAMPLE 6

Method One is demonstrated by the following example.

Low density polyethylene ($\rho=0.918$, MI=2) was nitrated to a level of 0.238 mM. of nitro groups per gram of polymer. Slabs .020" thick were pressed at 150° C. Slabs were vacuum sealed in test tubes along with 0.119 mM. of hexamethylene diisocyanate per gram of polymer. The tubes were immersed in a bath at 90° C. Crosslinking was determined by Young's Modulus and percent gel.

TABLE IV

| Hours, at 90° C. | Young's modulus (p.s.i.) at 150° C. | Gel, percent |
|---|---|---|
| 0 | <1 | 0 |
| 2 | 7.2 | Trace |
| 5 | 23 | 49 |
| 15 | 40 | 56 |

As a control experiment, slabs were vacuum-sealed with 0.24 mM. of phenyl isocyanate and some without any isocyanate. These sealed tubes were kept in a 90° C. bath for 15 hours. In both cases, the Young's Moduli at 150° C. were less than 5 p.s.i. and the gel percents were zero.

EXAMPLE 7

Method Two is demonstrated by the following example.

Low density polyethylene ($\rho=0.918$, MI=2) was nitrated to a level of 0.238 mM. of nitro groups per gram of polymer. Methylene-di-p-phenylene diisocyanate (0.12 mM/g. of polymer) was incorporated into the polymer in a Brabender Plastograph at 130° C. A slab .020" thick was fabricated at 150° C. The slab was essentially free of crosslinks, indicated by a Young's Modulus <5 p.s.i. at 150° C.

One part of the slab was exposed to atmospheric conditions for 4 days. The modulus increased to 107 p.s.i. at 150° C. The other part of the slab was kept in a desiccator with essentially zero relative humidity. Four days later, the modulus had increased to 12 p.s.i. at 150° C. This small increase may be due either to the trace of water in the desiccator causing some crosslinking by Method two, by slow progress of Method one, or by a combination of both.

EXAMPLE 8

Crosslinking produced by Method One is accelerated by the use of certain catalysts.

Low density polyethylene ($\rho=0.918$, MI=2) was nitrated to a level of 0.238 mM. of nitro groups per gram of polymer. Catalysts, when used, were incorporated to the polymer in a Brabender Plastograph at 130° C. Slabs .020" thick were pressed at 150° C. Slabs were vacuum sealed in test tubes along with 0.119 mole of hexamethylene diisocyanate per gram of polymer. The tubes were immersed in a bath at 90° C.

TABLE V

| | Hours, at 90° C. | Young's modulus, (p.s.i.) at 150° C. | Gel, percent |
|---|---|---|---|
| No catalyst | 2 | 7.2 | Trace |
| 1% cupric stearate | 2 | 42 | 67 |
| No catalyst | 5 | 23 | 49 |
| 0.5% cupric stearate | 5 | 71 | 66 |
| 0.5% dibutyltin diluarate | 5 | 54 | 57 |
| 0.5% dibutyltin dilaurate (no isocyanate) | 5 | <5 | 5 |

EXAMPLE 9

This example illustrates further the catalytic effect of various organo-metallic compounds on Method one. One percent of catalyst was milled into nitropolyethylene at 130° C. in a Brabender Plastograph containing 0.23 mM. of nitro group per gram of polymer. Slabs .025" thick were pressed and suspended in a closed resin kettle which was evacuated and placed in a 90° C. oven. 0.18 mM. of hexamethylene diisocyanate per gram of polymer was then introduced and the slabs were maintained at 90° C. for 5 hours. At the end of that time, Young's Modulus and gel percent were determined. The results are summarized in the table below.

TABLE VI

| Catalyst | Young's modulus, (p.s.i.) at 150° C. | Gel, percent |
|---|---|---|
| None | 7 | 38 |
| Dibutytin adipate | 28 | 65 |
| Dibutyltin dilaurate | 30 | 67 |
| Tetraphenyltin | 46 | 55 |
| Copper stearate | 84 | 69 |
| Cupric acetonylacetonate | 68 | 69 |
| Cobalt resinate | 26 | 68 |
| Ferrocene | 37 | 85 |
| Ferrous stearate | 53 | 87 |
| Vanadyl naphthanate | 64 | 67 |
| Vanadyl acetonylacetonate | 87 | 82 |
| Vanadium acetonylacetonate | 94 | 86 |
| Stannous octoate | 53 | 73 |
| Lead octoate | 36 | 55 |
| Zinc stearate | 26 | 68 |
| Chromium stearate | 20 | 63 |

EXAMPLE 10

The catalytic effect observed in the presence of certain organo-metallic compounds with Method two is illustrated by the following example.

Low density polyethylene ($\rho=0.918$, MI=2) was nitrated to a level of 0.238 mM. of nitro groups per gram of polymer. Bitolylene diisocyanate (0.227 mM./g. of polymer) was incorporated into the polymer along with varying concentrations of dibutyltin dilaurate in a Brabender Plastograph at 120° C. Slabs .020" thick were pressed at 150° C. The slabs were exposed to specified conditions. The time required to attain a Young's Modulus of 80 p.s.i. at 150° C. was recorded.

TABLE VII

| Dibutyltin dilaurate, percent | 90° C., 80% relative humidity time (hours) | 25° C., 80% relative humidity time (hours) |
|---|---|---|
| 0 | 35 | |
| 0.1 | 2.5 | 320 |
| 0.3 | 1.0 | 150 |
| 0.5 | 0.4 | 47 |
| 1 | 0.2 | 37 |

EXAMPLE 11

To further demonstrate the role of di or polyfunctional "active hydrogen" compounds in crosslinking according to Method two, the following experiment was performed.

Low density polyethylene ($\rho=0.918$, MI=2) was nitrated to a level of 0.23 mM. of nitro groups per gram of polymer. Bitolylene diisocyanate (0.23 mM./g. of polymer) and dibutyltin dilaurate (0.1 g./100 g. of polymer) were mixed into the polymer in a Brabender Plastograph at 150° C. After adequate mixing, ethylene glycol (0.23 mM./g. of polymer) was mixed into the hot compound. An instant increase in torque indicated a sudden increase in melt viscosity. The same effect was observed when hexamethylene diamine or glycerol was substituted for the ethylene glycol.

In both cases, gel measurements showed values between 30% and 60%. When monofunctional active hydrogen compounds were substituted to the di or polyfunctional ones, no crosslinking was observed either by increase in torque or by gel measurements.

EXAMPLE 12

Low density polyethylene ($\rho=0.918$, MI=2) was nitrated to a level of 0.24 mM. of nitro groups per gram of polymer.

Various diisocyanates were incorporated into the polymer along with 2% of 4,4'-thiobis(6-t-butyl-m-cresol) in a Brabender Plastograph at 120° C. Slabs .020" thick were pressed and subsequently crosslinked in a humidity chamber at 90° C., 80% relative humidity.

TABLE VIII

| Isocyanate | Grams of isocyanate/ grams of polymer | Young's modulus, (p.s.i.) at 150° C. |
|---|---|---|
| Methylene-di-p-phenylenediisocyanate | 4 | 62 |
| Hexamethylene diisocyanate | 3 | 48 |
| Dianisidinediisocyanate | 2 | 90 |
| Bitolylenediisocyanate | 4 | 73 |
| 4 methyl m phenylenediisocyanate | 2 | 46 |
| PAPI, an Upjohn Co. trademark for— | 4 | 36 |

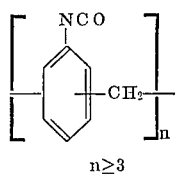

$n \geq 3$

EXAMPLE 13

To demonstrate the dependence of the maximum amount of crosslinking attainable in nitropolyethylene on the nitro group concentration in the polymer, nitropolyethylenes with varying amounts of nitration were prepared. Bitolylene diisocyanate, 6%, was incorporated into the polymers in a Brabender Pastograph at 120° C. Slabs .020" thick were pressed and placed in a humidity chamber at 90° C., 80% relative humidity. The slabs were kept in the chamber until the Young's Modulus at 150° C. on the slabs had reached the maximum value. These "maximum moduli" were plotted against the square of the nitro group concentration in the respective polymers and it appeared that the maximum moduli were directly proportional to the square of the nitro group concentration. The composition of all four samples was as follows:

| | G. |
|---|---|
| Nitropolyethylene | 100 |
| 4,4'-thiobis(6-t-butyl-m-cresol) | 1 |
| Dibutyltin dilaurate | 1 |
| Bitolylene diisocyanate | 1 |
| Ultra-fine magnesium silicate (Mistron Vapor) | 40 |
| Chlorinated hydrocarbon (Chlorowax 70) | 15 |
| Antimony trioxide | 10 |

The values are set forth in the following table.

Table IX

| mM. of $NO_2$/g. of polymer: | Young's Modulus (p.s.i.) at 150° C. (after crosslinking treatment) |
|---|---|
| 0.250 | 205 |
| 0.164 | 86 |
| 0.107 | 50 |
| 0.047 | 25 |

EXAMPLE 14

High density polyethylene ($\rho=0.960$, MI=0.3) was nitrated to a level of 0.34 mM. of nitro groups per gram of polymer. Bitolylene diisocyanate (0.23 mM./g. of polymer) and 1% of 4,4'-thiobis(6-t-butyl-m-cresol) were incorporated into the polymer in a Brabender Plastograph at 130° C. Slabs .020" thick were pressed at 150° C. They were kept in a humidity chamber at 90° C. and 80% relative humidity for various lengths of time.

Table X

| Hours in oven: | Young's Modulus (p.s.i.) at 150° C. |
|---|---|
| 0 | <5 |
| 88 | 26 |
| 136 | 43 |

EXAMPLE 15

Ethylene-ethyl acrylate copolymer (Union Carbide DPD 6169) was nitrated to a level of 0.343 mM. of nitro groups per gram of polymer. Six parts of bitolylene diisocyanate and 0.3 part of dibutyltin dilaurate were incorporated into 100 parts of the polymer in a Brabender Plastograph at 120° C. A slab .020" thick was pressed at 150° C. It was placed into a humidity chamber at 90° C. at 80% relative humidity for 88 hours. Young's Modulus at 150° C. had increased from <5 to 70 p.s.i.

EXAMPLE 16

Ethylene-vinyl acetate copolymer (Union Carbide DQDE 1868) was nitrated to a level of 0.56 mM. of nitro groups per gram of polymer. Bitolylene diisocyanate and other ingredients were incorporated into the polymer in a Brabender Plastograph at 120° C. Slabs .020" thick were pressed at 150° C. and placed subsequently in a humidity chamber at 90° C. and 80% relative humidity.

Table XI.—Composition A

| | G. |
|---|---|
| Copolymer | 100 |
| Bitolylene diisocyanate | 6 |

11

Composition B

| | |
|---|---|
| Copolymer | 100 |
| Bitolylene diisocyanate | 6 |
| 4,4'-thiobis(6-t-butyl-m-cresol) | 1 |
| Dibutyltin dilaurate | 0.5 |

RESULTS

| Time in humidity chamber, hours | Young's modulus, (p.s.i.) at 150° C. | |
|---|---|---|
| | Composition A | Composition B |
| 0 | <5 | <5 |
| 22 | 275 | 459 |

EXAMPLE 17

Polybutene-1 (Mobile Chem. S–30–0040) was nitrated to a level of 0.14 mM. of nitro groups per gram of polymer. Bitolylene diisocyanate and other ingredients were incorporated into the polymer in a Brabender Plastograph at 120° C. Slabs .020" thick were pressed at 150° C. which were subsequently kept in a humidity chamber at 90° C., 80% relative humidity.

Table XII.—Composition A

| | G. |
|---|---|
| Polymer | 100 |
| 4,4'-thiobis(6-t-butyl-m-cresol) | 1 |
| Bitolylene diisocyanate | 1.8 |

Composition B

| | |
|---|---|
| Polymer | 100 |
| 4,4'-thiobis(6-t-butyl-m-cresol) | 1 |
| Bitolylene diisocyanate | 1.8 |
| Dibutyltin dilaurate | 0.5 |

RESULTS

| Time in humidity chamber, hours | Young's modulus, (p.s.i.) at 150° C. | |
|---|---|---|
| | Composition A | Composition B |
| 0 | <5 | <5 |
| 22 | 68 | 92 |

EXAMPLE 18

The feasibility of crosslinking shaped articles in the presence of various compounding ingredients such as antioxidants, flame retardants, fillers, etc., by Method one is demonstrated by the following experiment.

Low density polyethylene ($\rho=0.918$, MI=2) was nitrated to a level of 0.24 mM. of nitro groups per gram of polymer. The ingredients were incorporated on a hot mill at 130° C.

Table XIII

| Compound: | Weight of ingredients (grams) |
|---|---|
| Nitropolyethylene | 1000 |
| 4,4'-thiobis(6-t-butyl-m-cresol) | 20 |
| Wilson S–3762 (pigment) | 50 |
| MgO | 50 |
| Thermofax (carbon black) | 350 |
| $Sb_2O_3$ | 200 |
| Aluminum tetrabromophthalate | 200 |

Wilson S–3762 is a masterbatch containing 50% by weight low density polyethylene and 50% by weight pigment-grade carbon black. Thermax is a filler-grade thermal carbon black, mesh size 200.

The compound was extruded into a rod and chopped. The so-formed pellets were used in the experiments.

The pellets were blow-molded into a syringe-shaped article. These fabricated syringes were exposed to hexamethylene diisocyanate vapors at 90° C. for 3 hours. The isocyanate-treated articles, when heated to 150° C., showed form stability and were crosslinked. They could be expanded above the melt temperature and cooled while being held in the stretched shape. When this distorted form was heated above the melting point of the polymer, it regained the original shape, exhibiting elastic memory. A part of this article was refluxed in xylene. The insoluble fraction was 43%. The control, a similarly shaped article which was not exposed to hexamethylene diisocyanate vapors, was heated to 150° C. and showed no melt strength. It melted and deformed permanently. It had no insoluble fractions when refluxed in xylene.

The pellets were also injection-molded into a test mold. They were treated similarly to the blow-molded articles, with comparable results.

EXAMPLE 19

The ability to incorporate various ingredients, including a diisocyanate and a catalyst into nitrated polyethylene, in this compound to fabricate an article and subsequently crosslink this article by Method two, is further demonstrated as follows.

High density polyethylene ($\rho=0.960$, MI=0.3) was nitrated to a level of 0.34 mM. of nitro groups per gram of polymer. Various ingredients were incorporated into the polymer on a hot mill at 130° C.

Table XIV

| Compound: | Weight of ingredients (grams) |
|---|---|
| Nitropolyethylene | 3000 |
| 4,4'-thiobis(6-t-butyl-m-cresol) | 30 |
| Bitolylene diisocyanate | 180 |
| $Sb_2O_3$ | 360 |
| Diels Alder adduct of 2 moles of hexachlorocyclopentadiene and 1 mole of cycloocto-1,5-diene | 360 |

The light tan colored compound was extruded on a 20 gauge wire at 130° C., forming a wall .015" thick. The polymer was not crosslinked at this point. This was shown by a Young's Modulus <5 p.s.i. at 150° C. and gel of less than 1%. Pieces of the insulated wire were placed in a humidity chamber at 90° C., 80% relative humidity. Young's Modulus at 150° C. increased to 82 p.s.i. after 16 hours and 203 p.s.i. after 96 hours.

EXAMPLE 20

The feasibility to crosslink shaped articles in the presence of various compounding ingredients well known to the art by Method two is demonstrated by the following experiment.

Low density polyethylene ($\rho=0.918$, MI=2) was nitrated to a level of 0.24 mM. of nitro groups per gram of polymer. Ethylene-ethyl acrylate copolymer was nitrated to a level of 0.22 mM. of nitro groups per gram of polymer. Various ingredients were incorporated on a hot mill at 130° C.

Table XV

| Compound: | Weight of ingredients (grams) |
|---|---|
| Nitropolyethylene | 364.4 |
| Nitrated ethylene-ethyl acrylate copolymer | 364.4 |
| 4,4'-thiobis(6-t-butyl-m-cresol) | 14.6 |
| Carbon black (Columbian 999) | 14.6 |
| Ultra-fine magnesium silicate (Mistron Vapor) | 218.6 |
| Dibutyltin dilaurate | 1.5 |
| 4-methyl-m-phenylene diisocyanate | 21.9 |

Tubing 0.5" outside diameter, with a 0.42" wall thickness, was fabricated by extrusion. It was not crosslinked prematurely as shown by <5 p.s.i. Young's Modulus at 150° C. The tube was set in a humidity chamber at 90° C. and 80% relative humidity for 8 hours. Young's Modulus at 150° C. had increased to 92 p.s.i. The tubing was expanded over a mandrel at 150° C. to twice the original diameter and cooled while in an expanded shape. When cool, the tubing remained in the expanded shape, but when reheated to 150° C., it shrank to its original crosslinked diameter.

EXAMPLE 21

This example illustrates the heat aging properties of the crosslinked polymers of this invention and the effectiveness of antioxidants with these polymers. Nitropolyethylene ($\rho=0.918$, MI=2) was crosslinked with hexamethylene diisocyanate (HMDI) and methylene-di-p-phenylene diisocyanate (MDI). The compositions also contained sym - di-beta-naphthyl-para-phenylenediamine and various other antioxidants and additives. The time to crack on flexing of the polymer samples was determined by heating the samples to the indicated temperature and bending them through 180° with cracking observed visually.

RESULTS

| Percent expansion | Percent[1] recovery | Creep-back |
|---|---|---|
| 100 | 100 | None. |
| 200 | 96 | Do. |
| 300 | 96 | Do. |

[1] Percent recovery= $100 \times \dfrac{1 \text{ inch}}{\text{distance after recovery in inches}}$ The foregoing examples are merely illustrative of the present invention and should in no way be considered as limiting the scope of the invention. Thus, any polymer

TABLE XVI

| Number | Millimoles of —NO₂ group/ gram of polymer | Al TBP[1] | Sb₂O₃ | Anti-oxidant | Antioxidant (percent) | Isocyanate | Young's modulus (p.s.i.) at 150° C. | Ultimate strength (p.s.i.) | Testing temperature, (° C.) | Hours to embrittle |
|---|---|---|---|---|---|---|---|---|---|---|
| 1 | 0.15 | | | | | HMDI | 23 | 94 | 175 | 37 |
| 2 | 0.15 | 15 | 15 | (2) | 1 | HMDI | 57 | 108 | 175 | 73 |
| 3 | 0.15 | 15 | 15 | (3) | 1 | HMDI | 39 | 113 | 175 | 105 |
| 4 | 0.15 | 15 | 15 | (4) | 2 | HMDI | 41 | 119 | 175 | 317 |
| 5 | 0.15 | 15 | 15 | (2) | 1 | MDI | 75 | 120 | 175 | 151 |
| 6 | 0.15 | 15 | 15 | (3) | 1 | MDI | 129 | 122 | 175 | 141 |
| 7 | 0.15 | 15 | 15 | (4) | 1 | MDI | 51 | 132 | 175 | 151 |
| 8 | 0.15 | 15 | 15 | (4) | 4 | MDI | 55 | 82 | 175 | 481 |
| 9 | 0.15 | 15 | 15 | (2) | 1 | HMDI | 57 | 108 | 200 | 26 |
| 10 | 0.15 | 15 | 15 | (3) | 1 | HMDI | 39 | 113 | 200 | 29 |
| 11 | 0.15 | 15 | 15 | (4) | 2 | HMDI | 41 | 119 | 200 | 56 |
| 12 | 0.15 | 15 | 15 | (2) | 1 | MDI | 75 | 120 | 200 | 34 |
| 13 | 0.15 | 15 | 15 | (3) | 1 | MDI | 129 | 122 | 200 | 26 |
| 14 | 0.15 | 15 | 15 | (4) | 1 | MDI | 51 | 132 | 200 | 30 |
| 15 | 0.15 | 15 | 15 | (4) | 4 | MDI | 55 | 82 | 200 | 78 |
| 16 | 0.24 | 15 | 15 | (2) | 2 | HMDI | 72 | 116 | 200 | 48 |
| 17 | 0.24 | 15 | 15 | (3) | 2 | HMDI | 87 | 104 | 200 | 64 |
| 18 | 0.24 | 15 | 15 | (2) | 2 | HMDI | 72 | 116 | 225 | 12 |
| 19 | 0.24 | 15 | 15 | (3) | 2 | HMDI | 87 | 104 | 225 | 14 |

[1] Aluminum tetrabromophthalate.
[2] 4,4'-thiobis(6-t-butyl-m-cresol).
[3] (Sym-di-beta-naphthyl-para-phenylenediamine).
[4] Condensation polymer of 4,4'-thiobis(6-t-butyl-m-cresol) and formaldehyde.

NOTE.—The concentrations of the additives are based on 100 parts of nitropolyethylene.

EXAMPLE 22

The elastic memory and creepback of chemically crosslinked nitropolyethylenes are illustrated by this experiment.

Nitropolyethylene ($\rho=0.918$, MI=2) containing 0.086 mM. of nitro group per gram of polymer was used. Various ingredients, including the diisocyanate, were incorporated into the polymer at 130° C. in a Brabender Plastograph. Slabs .020" thick were pressed at 150° C. The slabs were kept in a humidity chamber at 90° C., 80% relative humidity, for 3 days. The Young's Modulus at 150° C. of the slab increased from 7 p.s.i. to 75 p.s.i. Strips ⅛" wide were cut. A 1" mark was inscribed on these strips. The strips were then immersed in a 150° C. glycerine bath, and then expanded by hand to the required length and cooled while under this tension. When initially cooled, the stretched strips retained this elongation. The elongated strips were kept at room temperature for one week, then the distance between the two marks was measured and compared with the same obtained just after expansion. This would show if there was any creepback during this period. The strips were then immersed into a 150° C. glycerine bath. After recovery, they were cooled to room temperature. The distance between the two marks was measured and the percent recovery calculated.

TABLE XVII.—Composition

| Ingredients: | Weight of ingredients (grams) |
|---|---|
| Nitrated polyethylene | 100 |
| Sb₂O₃ | 15 |
| Aluminum tetrabromophthalate | 15 |
| 4,4'-thiobis(6-t-butyl-m-cresol) | 1 |
| Methylene-di-p-phenylene diisocyanate | 2.3 | which can be nitrated to form active sites may be crosslinked with polyisocyanates according to this invention. Although the invention is particularly useful in solid state crosslinking, molten state crosslinking may be employed. Furthermore, any desired method of incorporating the polyisocyanate, catalysts and other materials into the polymer may be used. The nitropolyethylene may be converted to a heat recoverable and shaped article by any conventional fabricating technique such as molding, extruding, etc. Also, since crosslinking is achieved by diffusing both the nitrogen dioxide and polyisocyanate, the process of this invention may be used for selective crosslinking of shaped structures by controlled diffusion into the structure. Thus, it can be seen that the scope of the invention is limited only by the lawful scope of the appended claims which follow.

I claim:

1. The method of crosslinking a polymer of a monoethylenically unsaturated monomer, said polymer containing repeating —CH₂— groups and at least 2

groups per polymer chain engaging in crosslinking, which comprises introducing into the polymer crosslinking proportions of a polyisocyanate crosslinking agent, and reacting the said agent and polymer for a time and at a temperature sufficient to achieve crosslinking.

2. The method of crosslinking a polymer of a monoethylenically unsaturated monomer, said polymer containing repeating —CH₂— groups, which comprises nitrating the polymer to provide at least 2

groups per polymer chain engaging in crosslinking, introducing into the nitrated polymer crosslinking proportions of a polyisocyanate crosslinking agent, and reacting the said agent and nitrated polymer for a time and at a temperature sufficient to achieve crosslinking.

3. The method of claim 1 wherein the reaction of said polyisocyanate with said polymer is carried out in the presence of a polyfunctional active hydrogen compound selected from the group consisting of polyfunctional alcohols, polyfunctional amines and water.

4. The method of claim 1 wherein said polymer is a homopolymer of a monomer selected from the group consisting of ethylene, butene-1, vinyl acetate, ethyl acrylate, and cetyl acrylate.

5. The method of claim 1 wherein said polymer is a copolymer of ethylene and a monomer selected from the group consisting of vinyl acetate and ethyl acrylate.

6. The method of claim 1 wherein said polyisocyanate, in the vapor state, is contacted with said polymer in the solid state.

7. The method of claim 1 wherein the ratio of isocyanate groups to nitro groups is about 1:1.

8. The method of claim 3 wherein the ratio of isocyanate groups to nitro groups is about 2:1.

9. The method of claim 3 wherein said polyfunctional active hydrogen compound is selected from the group consisting of polyfunctional alcohols, polyfunctional amines and water.

10. The method of claim 3 wherein said polyfunctional active hydrogen compound is water.

11. The method of claim 3 wherein said polyfunctional active hydrogen compound is a polyfunctional alcohol.

12. The method of claim 3 wherein said polyfunctional active hydrogen compound is a polyfunctional amine.

13. The method of claim 4 wherein said polymer is polyethylene.

14. The method of claim 4 wherein said polymer is polybutene-1.

15. The method of claim 4 wherein said polymer is polyvinyl acetate.

16. The method of claim 4 wherein said polymer is polyethyl acrylate.

17. The method of claim 4 wherein said polymer is poly(cetyl acrylate).

18. The method of claim 1 wherein said polyisocyanate is 4-methyl-m-phenylene diisocyanate.

19. The method of claim 1 wherein said polyisocyanate is methylene-di-p-phenylene diisocyanate.

20. The method of claim 1 wherein said polyisocyanate is polymethylene polyphenyl isocyanate.

21. The method of claim 1 wherein said polyisocyanate is hexamethylene diisocyanate.

22. The method of claim 1 wherein said polyisocyanate is bitolylene diisocyanate.

23. The method of claim 1 wherein said polyisocyanate is dianisidine diisocyanate.

24. A method of forming a crosslinked polymeric article comprising
(1) introducing a liquid polyisocyanate into a polymer of a monoethylenically unsaturated monomer, said polymer containing repeating —CH₂— groups and at least 2

groups per polymer chain engaging in crosslinking;
(2) reacting said polyisocyanate and polymer for a time and at a temperature sufficient to provide isocyanate functions pendant from said polymer chains;
(3) forming a shaped article;
(4) introducing a polyfunctional active hydrogen compound selected from the group consisting of polyfunctional alcohols, polyfunctional amines and water into said article;
(5) reacting said compound and said pendant isocyanate functions such that polymer chains engaging in crosslinking are joined through carbon atoms in the polymer chain from which the isocyanate functions depend, for a time and temperature sufficient therefor; the said compound and polyisocyanate being employed in proportions which provide, upon completion of reaction (5), appreciable crosslinking.

25. The method of claim 24 wherein said polymer is a copolymer of ethylene and a monomer selected from the group consisting of vinyl acetate and ethyl acrylate.

26. A method of forming a crosslinked article comprising
(1) forming into a shaped article a polymer of a monoethylenically unsaturated monomer, said polymer containing repeating —CH₂— groups and at least 2

groups per polymer chain engaging in crosslinking;
(2) introducing crosslinking proportions of a polyisocyanate crosslinking agent in the vapor phase into said article; and
(3) reacting said polymer and polyisocyanate crosslinking agent for a time and at a temperature sufficient to achieve crosslinking.

27. A crosslinked polymer prepared according to the method of claim 1.

28. A crosslinked polymer prepared according to the method of claim 24.

29. A crosslinked polymer prepared according to the method of claim 3.

30. A crosslinked polymer prepared according to the method of claim 4.

References Cited

UNITED STATES PATENTS

| 2,381,063 | 8/1945 | Küng | 260—77.5 |
| 2,386,347 | 10/1945 | Roland, Jr. | 260—80.75 |
| 2,603,665 | 7/1952 | Young | 260—644 |
| 3,254,068 | 5/1966 | Furrow | 260—88.7 |
| 2,265,722 | 12/1941 | de Nie | 260—94.7 |
| 2,905,582 | 9/1959 | Coleman | 154—139 |
| 3,445,437 | 5/1969 | Reich | 260—80 |

FOREIGN PATENTS

| 494,222 | 7/1953 | Canada | 260—94.7 |

JOSEPH L. SCHOFER, Primary Examiner

C. A. HENDERSON, JR., Assistant Examiner

U.S. Cl. X.R.

106—15; 252—8.1, 260—2, 41, 45.9, 45.95, 77.5, 80, 87.3, 89.5, 93.7, 94.7, 94.9, 644, 838